United States Patent [19]

Malaker

[11] Patent Number: 4,843,826
[45] Date of Patent: Jul. 4, 1989

[54] VEHICLE AIR CONDITIONER

[75] Inventor: Stephen F. Malaker, Mountainside, N.J.

[73] Assignee: Cryodynamics, Inc., Mountainside, N.J.

[21] Appl. No.: 107,274

[22] Filed: Oct. 9, 1987

[51] Int. Cl.⁴ ............................................. F25B 9/00
[52] U.S. Cl. ......................................... 62/6; 60/520; 62/244
[58] Field of Search ............... 62/6, 244, 434; 60/520

[56] References Cited

U.S. PATENT DOCUMENTS

| | | | |
|---|---|---|---|
| 2,737,027 | 3/1956 | Kleist | 62/434 X |
| 2,779,171 | 1/1957 | Lindenblad | 62/434 X |
| 2,787,129 | 4/1957 | Evans | 62/434 X |
| 3,074,244 | 1/1963 | Malaker et al. | 62/6 |
| 3,080,706 | 3/1963 | Flynn, Jr. et al. | 62/6 X |
| 3,188,822 | 6/1965 | Daunt | 62/6 |
| 3,247,678 | 4/1966 | Mohlman | 62/434 X |
| 3,766,752 | 10/1973 | Lanig | 62/434 X |
| 4,526,008 | 7/1985 | Taylor, Sr. | 60/520 X |
| 4,637,222 | 1/1987 | Fujiwara et al. | 62/244 |

*Primary Examiner*—William E. Tapolcai
*Attorney, Agent, or Firm*—Kevin McMahon

[57] ABSTRACT

A vehicle air conditioning system in which air or a working liquid is circulated through a heat exchanger mounted in intimate thermal contact with the cold head of a modified Stirling cycle refrigerator. The working liquid is circulated through a heat conductive tube to the location of the vehicle to be cooled. Second heat exchangers are connected to the tube at each of the locations and the air to be cooled is blown through the second heat exchangers. If air is circulated through the cold head mounted heat exchanger, the cooled air is ducted to the locations in the vehicle to be cooled.

16 Claims, 3 Drawing Sheets

VEHICLE AIR CONDITIONER

This invention relates generally to air conditioning systems for vehicles, and more particularly to air conditioning systems for large vehicles such as buses and the like.

BACKGROUND

The vast majority of, if not all, air conditioning systems in use today operate in accordance with the Rankins cycle in which a working gas, normally a fluorocarbon, is compressed to a liquid state by a compressor and circulated through condenser coils under high pressure to dissipate the heat of compression to the external ambient. The cooled compressed working fluid is then circulated under low pressure through evaporator tubes where it evaporates and extracts heat from the air to be cooled. After being evaporated, the working gas is recirculated back to the compressor where it is compressed again to begin the next cycle.

Although such air conditioning systems have been in extremely wide use for many years they continue to have severe problems. Air conditioning systems are one of the least reliable and most inefficient systems in a vehicle. The leakage of the fluorocarbon working gas is a particularly growing concern with all air conditioning systems since it has been recognized in recent years as a major contributor to the destruction of the stratospheric ozone layer. As a result, efforts are growing to minimize and eventually eliminate the use of fluorocarbons to the extent possible.

Such air conditioning systems have additional severe, inherent disadvantages. The air to be cooled is blown past the evaporator coil by a blower fan to cause the expansion of the working fluid in the coil to extract heat from the air. The expansion of the working fluid in the evaporator requires a large volume so that the evaporator tube must be quite long and occupies a large cross-sectional area. The heat from the air to be cooled must be transferred from the air to the aluminum fins that are typically affixed to the evaporator tube, from the fins to the copper evaporator tube, and from the tube to the working fluid. This 4-step process is inherently inefficient. If the fins are not present as they are not in many instances, the heat exchange is even less efficient. Because the heat exchanger is inefficient, the temperature of the evaporator tube must be far below that to which the air is to be cooled. This results in excessive condensation of moisture from the air onto the tube which further reduces efficiency. In addition, the collection of water on the tube, especially at locations shielded by the tube from the flow of air, can cause icing that can ultimately disable the system. While certain amount of dehumiiification of the air is beneficial, excessive dehumidification can be unhealthful.

In large vehicles, such as buses, the evaporator coils are positioned at one location in the bus, normally at the back or on the roof. Thus, the cooled air must be conducted through ducts for substantial distances to cool remote portions of the vehicle which results in further losses of cooling efficiency.

Such large vehicle air conditioning systems are also inflexible in that there is one evaporator coil and all the air being circulated is cooled to the same degree. Thus the system is unable to compensate for variations in the required cooling load in different parts of the bus as the bus moves. For instance, if direct sunlight hits one side of the bus while the other side is shaded, the cooling load to maintain the sunny side of the bus at a particular temperature is substantially higher than that on the other side. As the bus travels, the cooling loads in different parts of the vehicle change continually depending on its orientation with respect to the sun and other factors. A special cooling loop is sometimes provided for the driver alone.

Another energy wasting consequence of the limitations of available vehicle air conditioning systems arises from the fact that when the driver has to wait for extended periods on a warm day, he will usually keep the motor and the air conditioning system running to cool the entire bus.

In addition to these difficulties, vehicle air conditioning systems are generally heavy, bulky and noisy and require major maintenance at frequent intervals.. Thus they adversely affect fuel economy, vehicle design flexibility and reliability and passenger comfort.

SUMMARY OF THE INVENTION

To overcome these and other problems with existing air conditioning systems, applicants provide in accordance with a first embodiment of the invention an air conditioning system for a vehicle such as a bus or the like, which comprises a refrigerator having a cold head with a heat exchanger mounted thereon and means for circulating a working fluid between the heat exchanger and locations in the vehicle to be cooled. Second heat exchangers are coupled to said circulating means at each of the locations to be cooled and means are provided for blowing air to be cooled through said second heat exchangers and for recirculating air from the interior of the vehicle to the air blowing means. Means are further provided for controlling the refrigerator and the blowing means for regulating the temperature of the air in the various parts of the vehicle.

Dehumidification of the air being circulated is accomplished at each of the locations and means are provided for collecting and conducting away the water condensed from the air by the second heat exchangers.

In accordance with an important aspect of the invention the refrigerator may include a modified Stirling cycle refrigerator of the type described in U.S. Pat. No. 3,074,244 which have proved to have substantial advantages over other known types of refrigeration systems. Such refrigerators are inherently lighter, less expensive, more reliable and more efficient than any other available system. Additional important advantages are that they operate using non-hazardous working gases, such as helium or nitrogen, and require no condenser or evaporator coils.

In accordance with another embodiment of the invention, the air to be cooled may be circulated through a heat exchanger mounted on the cold head of the refrigerator unit and conducted to the locations to be cooled.

Another feature of the air conditioning system in accordance with the invention is that the modified Stirling cycle refrigerator of the preferred embodiment of the invention is conveniently electrically driven so that there are relatively few restrictions on its placement in the vehicle. Preferably the electrical power is provided by a generator driven by the vehicle motor. The generator may also be powered separately by an auxiliary motor. The power is coupled to the refrigerator by an electrical cable. This arrangement, coupled with the absence of condenser and evaporator coils and the relative low cost of the refrigerator unit, has the important advantage of permitting the use of multiple refrigerator units cooling different parts of the vehicle and allows the control means easily to supply varying amounts of cooling to the different parts.

These and other advantages and features of the invention will become more fully apparent from the following detailed description of the preferred embodiment of the invention as illustrated in the accompanying drawings.

DETAILED DESCRIPTION

Figure 1:
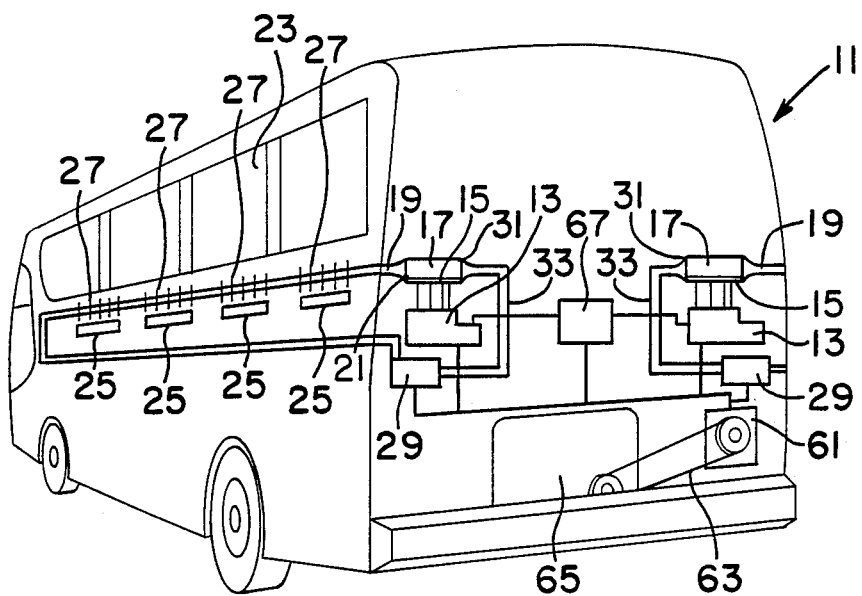
FIG. 1 is a perspective view of bus incorporating a first embodiment of an air conditioning system in accordance with the invention.
Figure 2:
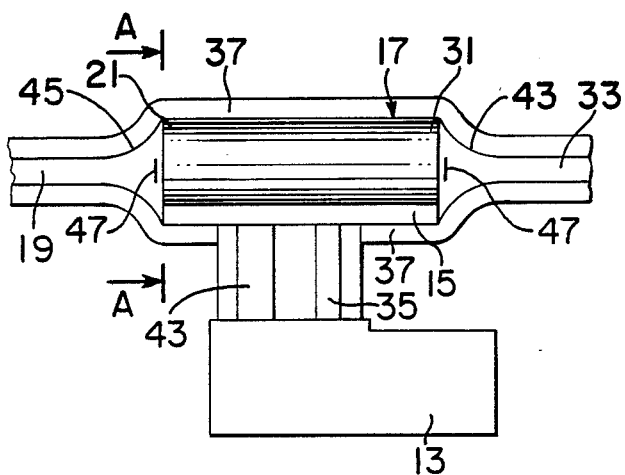
FIG. 2 shows the refrigerator and heat exchanger units of the refrigeration system of FIG. 1.

Referring now to FIGS. 1 and 2 of the drawings, there is illustrated a bus 11 incorporating a dual air conditioning system in accordance with the invention. Each air conditioning system includes a modified Stirling cycle refrigerator unit 13 having cold head 15 on which is mounted a heat exchanger 17. Working liquid circulating tube 19 is connected to the outlet side 21 of the heat exchanger I and conducts the working liquid along the adjacent side of the bus 11 beneath the windows 23. Spaced along each side of the bus below and adjacent to the tube 19 are a plurality of tangential fans 25 for blowing the air to be cooled through heat exchanger fins 27 attached to the portion of the tube 19 which is directly above the tangential fan 25. After traversing the full length of the bus the tube 19 is returned to the rear of the bus to the pump 29. From the pump 29 the working liquid is returned to the inlet side 31 of the heat exchanger 17 through the tube 33.

Figure 3:
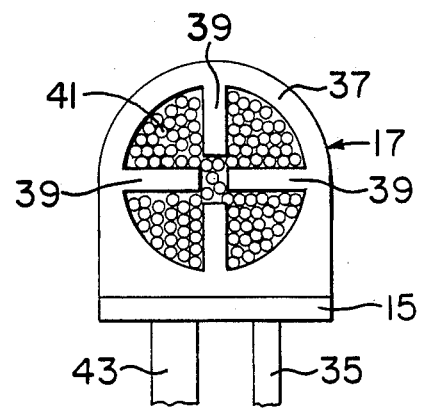
FIG. 3 is an end view of the heat exchanger unit of FIG. 2 taken along the section line A—A.

Referring now to FIGS. 2 and 3 of the drawings, the refrigerator 13 in the preferred embodiment of the invention is an improved version of the type described in U.S. Pat. No. 3,074,244 and operates in the same basic manner as described in that patent and in the co-pending applications Ser. No. 060,034, filed June 9,1987; and Ser. No. 085,536, filed Aug. 14, 1987. The refrigerator 13 is driven by an electrical motor and includes at least one compressor and expander piston pair driven by the motor. The refrigerator 13 is encased in a hermetically sealed case whose interior is filled with a working gas which is preferably helium, although nitrogen can also be used.

As is more completely described in the above referenced patent, the working gas is isothermally compressed in the compression cylinder with the heat of compression being dissipated through heat exchangers formed in the case of the refrigerator 13. The compressed working gas is transferred at a constant volume through a regenerator 35 and the cold head 15 to an expander cylinder 43 where it is isothermally expanded by an expander piston. During the expansion heat is extracted from the cold head 15. The working gas is then transferred at a constant volume back through the cold head 15 and regenerator 35 to the compression cylinder where the cycle begins again.

The cold head 15 is progressively cooled on each cycle until it reaches the desired temperature. Embodiments of the refrigerators operating in the above described manner designed for cryogenic applications easily reach temperatures of 77° K. at the cold head. For ease of illustration the refrigerator 13 is shown as having one compressor/expander piston pair. In actual embodiments it is more likely that two or three compressor/ expander piston pairs would be used for increased efficiency. To decrease thermal loading on the system the heat exchanger 17 and inlet and outlet tubes 19 and 33 are preferably surrounded by a layer of insulating material 37 and the compressor/expander piston pair are also insulated from the ambient, for instance by a layer of insulating material or by a vacuum jacket.

The heat exchanger 17 is formed of a cylindrical casing 37 which is fabricated from highly heat conductive metals such as copper. The casing 37 is mounted directly in contact with the cold head 15 of the refrigerator 13. It is extremely important that good thermal contact is established between the cold head 15 and the case 37 to ensure good heat transfer therebetween. Four ribs 39 extend into the interior of the housing 37 over its entire length for minimizing temperature gradients within the housing. The ribs 39 are preferably formed of the same material as, and integrally with, the casing 37. The interior of the casing 37 is filled with thin walled metal tubes, each of which runs the full length of the heat exchanger 17 from inlet 31 to outlet 21. The tubes 41 are formed of a highly heat conductive metal such as copper or aluminum. The entire interstitial space between adjacent tubes 41 and between the tubes 41 and the internal surface of the heat exchanger casing 37 is filled with a highly conductive material such as solder or a highly conductive metallized epoxy in order to maximize the heat transfer between the tubes 41 and the casing 37. The tubes 41 are preferably about 3/8" in internal diameter. The internal dimension of the casing 37 and its length depends upon the cooling capacity required of the system but a heat exchanger of about 6" long and 5" in internal diameter would be a typical size.

The inlet and outlet tubes 33 and 19 are connected to the inlet and outlet sides 31 and 21, respectively of the heat exchanger 17 through manifolds 43 and 45, respectively. The configuration of the manifolds 43 and 45 are designed to minimize hydraulic loss and turbulence in conducting the working liquid from the tube 33 to the heat exchanger 17 and from heat exchanger 17 to the tube 19. The design principles for such manifolds are discussed in the book "Heat Transfer" by J. P. Holman which was published by the McGraw-Hill Book Company in 1963. In order to minimize losses it may be desirable to incorporate diffusers 47 in the manifolds 43 and 45. The diffusers 47 can take the form of a small screen positioned centrally in the manifolds 43 and 45.

Figure 4:
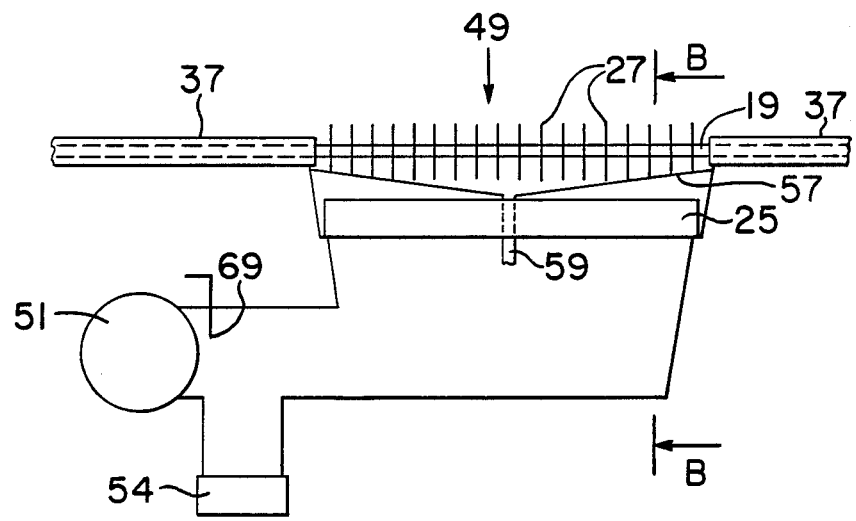
FIG. 4 shows the working liquid distribution and air cooling system of the air conditioning system of FIG. 1 from the interior of the vehicle.
Figure 5:
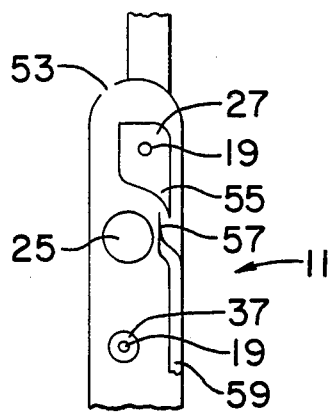
FIG. 5 is a side view of the liquid distribution system of FIG. 4 taken at the sections lines B—B.

Referring now to FIGS. 4 and 5 of the drawings there is illustrated one of the locations 49 along the side of the bus 11 at which conditioned air is provided in accordance with the invention. The tube 19 is covered by insulating material 37 at all points except at the locations 49. At each location 49 a plurality of heat transfer fins 27 are affixed to the tube 19 in a well known manner to provide efficient heat transfer between the liquid in the tube 19 and the air passing by the fins 27. The fins 27 are formed from a highly heat conductive metal such as aluminum. Air from the interior of the bus 11 is collected at a return 51 and blown by the tangential fan 25 upwardly through the heat transfer fins 27 and the vents 53 into the passenger compartment of the bus 11. The vents 53 may be positioned in a ledge immediately below the windows of the bus 11. Make-up air from the exterior of the bus is metered into the return by the vent 54. Preferably the air passing through the heat transfer fins 27 is about 80% recirculated and about 20% fresh air from the vent 54.

The fins 27 have a downwardly extending pointed section 55 at the bottom thereof which is positioned directly over a trough 57 for conducting water condensing on the fins 27 to the trough 57 from whence it can be conducted to the exterior of the bus by the tube 59. The bottom of the trough 57 slopes downwardly from either end toward a central location where the tube 59 is connected.

Electrical power for the air conditioning system in accordance with the illustrated embodiment of the invention is provided by the generator 61 which is driven by a belt drive 63 from the bus motor 65. In certain circumstances it may be preferable to provide an additional drive motor for the generator 61 to be used when only a portion of the bus is to be cooled, such as when the driver is waiting alone on the bus for an extended period of time. In such cases it may also be preferable to provide a separate refrigerator unit, heat exchanger and air cooling arrangement for the driver's portion of the bus. A clutch system may be used to permit the generator to be driven efficiently either from the motor 65 or from the auxiliary motor.

The air conditioning system in accordance with the illustrated embodiment of the invention is controlled by a microprocessor based electronic control system 67, the detailed structure of which is well within the state of the art so that the detailed circuitry is not described here. The control circuitry 67 senses the temperature and humidity of the air in various locations in the bus 11 such as by temperature sensors 69 positioned at the returns 51 (FIG. 4. Humidity sensors may be positioned near the front and rear of the bus.

Because of the much higher efficiency of the heat exchanger 17 than those used in prior air conditioning systems it is not necessary for the temperature of the heat exchanger 17 to be nearly as low as is required for the evaporator tubes of the prior art air conditioning systems. Thus freezing of the working liquid is not a concern. The preferred working liquid is water, but any non-corrosive, high heat capacity, low viscosity liquid can be used, such as commercially available heat transfer fluids, for instance those sold under the trademarks Prestone or Therminal.

In order to maximize the efficiency of the heat transfer between the working liquid in the tubes 19 and the heat exchanger fins 27 at the locations 49, the tubes 19 are extruded from a highly heat conductive metal such as copper or aluminum and have internal fins to maximize the contact area between the working liquid and the tube. The velocity of the working liquid in the tubes 19 is controlled to minimize hydraulic losses and the velocity of the air passing through the fins 27 is controlled to maximize heat transfer. Therefore the temperature of the working liquid need be only about 2 to 5° below the desired temperature of the output cooled air exiting from the vent 53. For an output air temperature of 65° F. the temperature of the working liquid need be only about 60° F. This is sufficiently below the dew point of the air to be cooled that condensation of excess moisture takes place on the heat exchanger fins 27, but is not so far below the dew point that excessive dehumidification or freezing takes place. Preferably the air exiting the vent 53 is about 65° with a relative humidity of about 50%. As pointed out above, the condensed moisture on the fins 27 drips into the trough 57 for removal from the interior of the bus.

The control circuit 67 controls the air conditioning system to achieve even temperatures in the various parts of the bus under varying load conditions by controlling the temperature of the working liquid in the tube 19, the flow rate of the liquid, and the air flow at each of the locations 49. The temperature of the working liquid is controlled by controlling the duty cycle of the refrigerator unit 13. If a D.C. motor is used, the motor speed can also be varied to control the working liquid temperature. The flow rate of the working liquid is controlled by controlling the speed of the pumps 29 and the air flow is at the locations 49 is individually controlled by the fans 25.

The use of separate refrigerator and heat exchanger pairs for each side of the bus provides an additional important degree of control. Since the refrigerator units 13 are electrically powered and are relatively inexpensive, it is practical to have more than two units in the air conditioning systems and to place them in various parts of the bus. For instance, with four refrigerator/heat exchanger pairs, each with its own working liquid circulation system, it is possible to divide the bus into four sections, all controlled by the control circuitry 67. In addition, as mentioned above, it is possible to have a separate refrigerator/heat exchanger pair for the driver or to use one of the four systems for such purpose. In the latter case, when the driver is alone on the bus it is necessary only to cool one quarter of the bus.

Figure 6:
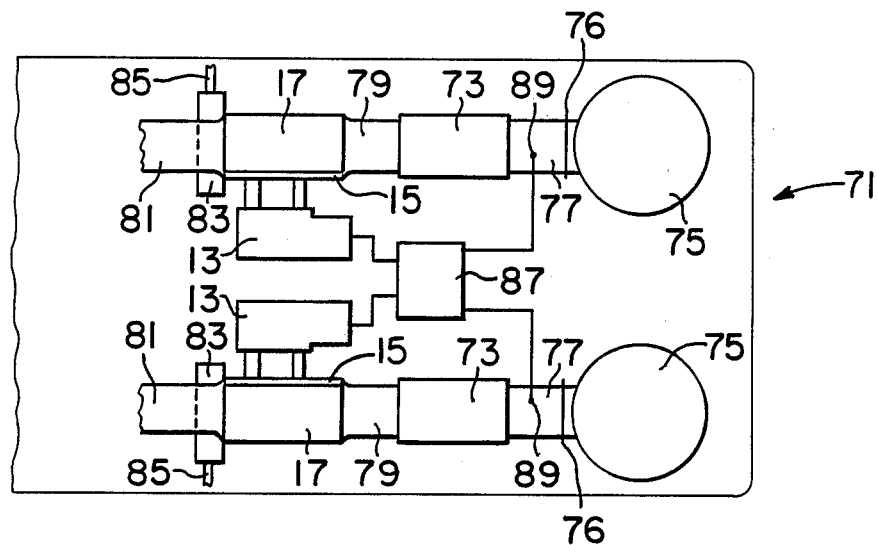
FIG. 6 is a partial top view of a bus incorporating an air conditioning system in accordance with a second embodiment of the invention.

From an overall cooling point of view the most efficient location for the air conditioning system in accordance with the invention is on the roof of the vehicle because cold air falls. Referring now to FIG. 6 of the drawings there is illustrated an alternative embodiment of the invention in which the air conditioning system is installed in the roof of the bus and in which the heat exchangers directly cool the air being recirculated rather than a working liquid as in the embodiment as in the embodiment illustrated in FIGS. 1 through 4. It is equally possible to incorporate a system working in accordance with the first embodiment of the invention into the roof of a bus and in many applications may be preferable since the heat exchanger used to cool the working liquid can be smaller and more efficient than that required to cool the air directly. In addition it is easier to conduct the working liquid to remote parts of the vehicle through an insulated tube than it is to provide the much larger air ducts. Besides being more bulky, the air ducts are likely to experience greater heat losses.

The heat exchanger 17 is mounted on the cold head 15 of the refrigerator unit 13. Air from the interior of the vehicle is pumped by the blowers 73 from the returns 75 through the filters 76 and the heat exchanger 17 by means of ducts 77 and 79. The air is cooled as it passes through the heat exchanger 17 and is distributed to various portions of the bus by the output ducts 81 through diffusers (not shown) of the type normally used in buses. Condensation resulting from the cooling of the air in the heat exchanger 17 is collected in the troughs 83 and conducted to the exterior of the vehicle by tubes 85.

The microprocessor based control circuit 87 controls the temperature and humidity of the conditioned air being supplied to the interior of the bus by controlling the duty cycle of the refrigerators unit 13 and the flow rate of the air delivered by the blowers 73. The temperature of the air is sensed by the temperature sensors 89 located in the input ducts 77. The humidity of the air may also be sensed if desired by commercially available sensors.

Figure 7:
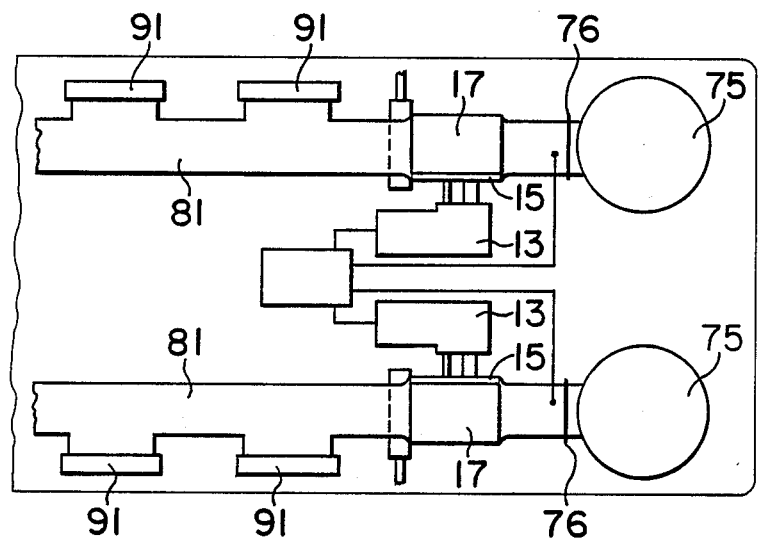
FIG. 7 is a partial top view of a bus incorporating an air conditioning system in accordance with a third embodiment of the invention.

Referring now to FIG. 7 of the drawings there is illustrated third embodiment of the air conditioning system in accordance with the invention which is similar to that illustrated in FIG. 6 except that the blowers 73 are eliminated and the air is pulled through the heat exchanger 17 by the individually controlled tangential fans 91 which are located along the output ducts 81 from the heat exchangers 17. The air conditioning system of FIG. 7 operates in basically the same manner as that in FIG. 6 except that the control circuit 87 individually controls the actuation and duty cycle of the fans 91 to deliver the required amounts of air to maintain even temperatures throughout the bus. In this case, the temperature sensors instead of being placed adjacent the return 75 are located in portions of the bus near the fans 91 but out of the direct flow of cooled air from those fans. The fans 91 and their connection to the output duct are conventional and so are shown schematically in FIG. 7.

The heat exchanger 17 in the embodiments of the invention illustrated in FIGS. 6 and 7 can be of the same structure as is illustrated in FIG. 3 but in this case the dimensions of the unit must be adjusted to account for the fact that air rather than a liquid is being cooled. The size of the heat exchanger 17 will depend on the cooling capacity and air flow capabilities required but typical dimensions are about 9" in length and about 8" in internal diameter with the individual tubes 41 having an internal diameter of about ⅛".

Figure 8:
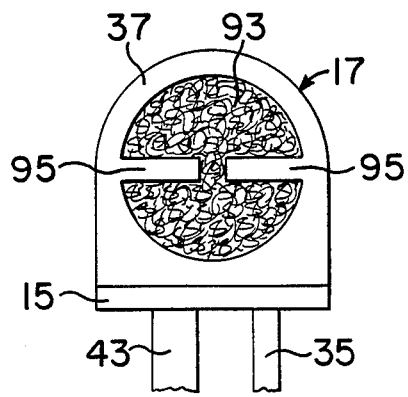
FIG. 8 is an end view of the heat exchanger in the air conditioning system in accordance with FIGS. 7 and 8.

FIG. 8 shows an alternative embodiment of the heat exchanger 17 in accordance with the invention in which the interior of the casing 37 is filled with a foam metal 93 rather than with the tubes 41 shown in FIG. 3. The foam metal may be formed of any highly heat conductive metal foam and is preferably made of copper foam having an open connective porosity of about 25% of the volume of the foam. Such foam metal is available from various sources such as General Electric Co. and Huyck Metals, Inc. The casing 37 includes two ribs 95 which extend into the internal area occupied by the foam to insure even temperature of the foam 93. The ribs 9 must be in intimate thermal contact with and are preferably integral with the walls of the casing 37. Although two ribs 95 are shown in FIG. 8 it is equally possible to have a greater number such as 3 or 4 ribs depending on design considerations. The same is true of the ribs 39 in the embodiment of the heat exchanger illustrated in FIG. 3 of the drawings. The ribs 39 in FIG. 3 and 95 in FIG. 8 extend the full length of the heat exchanger 17.

The connection between the air ducts to the inlet and outlet of the heat exchanger 17 are contoured to minimize turbulence in the air near the inlet and outlet of the heat exchanger 17 in accordance with the well known design considerations described in the literature such as in the book "Compact Heat Exchangers" by Karp and London, published by John Wiley, in various articles and books by Martinelli.

While the illustrated embodiment of the invention has been described in terms of an air conditioning system for a large vehicle, such as a bus, it should be apparent that embodiments of the invention are also applicable to smaller vehicles such cars, truck cabs, or to non-vehicular environments such as small buildings of the type used by the military in field locations. In a car, it would be preferable in most cases to have the heat exchanger attached to the cold head cool the air directly, rather than going through a working liquid.

I claim:

1. An air conditioning system for a vehicle such as a bus or the like, comprising:
   a refrigerator having a cold head;
   a heat exchanger mounted on said cold head and including:
      a heat conductive housing having an inlet and an outlet and a chamber connecting said inlet and outlet; and
      heat conductive material in said chamber in intimate thermal contact with said housing and having a plurality of fluid flow paths therein extending from said inlet to said outlet, each of said paths being in intimate thermal contact with said housing through said material;
   means for circulating a working fluid between said heat exchanger and locations in said vehicle to be cooled;
   heat exchanger means coupled to said circulating means at each of said locations;
   means for blowing air to be cooled through said heat exchanger means;
   return means for recirculating air from the interior of said vehicle to said blowing means, and
   means for controlling said refrigerator and said blowing means for regulating the temperature of the air in said vehicle.

2. The vehicle air conditioning system of claim 1 wherein said heat conductive housing includes rib means extending into said chamber for improving thermal contact with portions of said material in central areas of said chamber.

3. The vehicle air conditioning system of claim 2 wherein said fluid flow paths include a plurality of heat conductive tubes, and wherein said material includes heat conductive filler material occupying the interstitial spaces between adjacent tubes and between said tubes and said and said housing.

4. The vehicle air conditioning system of claim 2 wherein said material includes metal foam.

5. The vehicle air conditioning system of claim 1 wherein said refrigerator includes an electrically powered modified stirling cycle refrigerator.

6. The vehicle air conditioning system of claim 1 wherein said heat exchanger means includes heat conductive finned means attached in thermal contact with said circulating means, and means for exhausting liquid condensing on said heat exchanger means from said vehicle.

7. The vehicle air conditioning system of claim 6 wherein said exhausting means includes a downwardly extending portion of said finned means and trough means positioned under said downwardly extending portion for collecting water dripping from said finned means.

8. An air conditioning system, comprising:
a modified Stirling cycle refrigerator having a cold head;
a heat exchanger mounted in intimate thermal contact with said cold head and including:
a thermally conductive housing mounted on said cold head, said housing having an inlet and an outlet; and
thermally conductive material in said housing, said material being in intimate thermal contact with said housing and having a plurality of fluid flow paths therein passing between said inlet and said outlet;
means for pumping a fluid through said material for cooling said fluid; and
means for circulating said fluid from the outlet of said housing to a location to be cooled.

9. The air conditioning system of claim 8 wherein said material includes a plurality of metal tubes each extending from said inlet to said outlet and a heat conductive filler filling the interstities between adjacent tubes and between said tubes and said housing.

10. The air conditioning system of claim 3 wherein said material includes foam metal filling the interior of said housing from the inlet to the outlet.

11. The air conditioning system of claim 10 wherein said fluid includes air, and further including means for circulating said air to the volume being cooled.

12. The air conditioning system of claim 11 wherein said circulating means includes a duct connecting the said outlet to a plurality of locations in said volume, blower means at each of said locations for drawing cooled air from said duct and expelling said cooled air into said volume, and means for selectively controlling the actuation of said blower means.

13. The air conditioning system of claim 12 further including means proximate said outlet for collecting and removing water condensed from said air by said heat exchanger.

14. The air conditioning system of claim 12 further including means for filtering particulates from the air before it enters said inlet.

15. The air conditioning system of claim 9 wherein said fluid includes a working liquid and said circulating means includes a tube for circulating said liquid from the outlet of said heat exchanger to a plurality of locations in the area to be cooled and said pumping means and back to the inlet of said heat exchanger, and further including a second heat exchanger at each of said locations, said second heat exchangers each including a plurality of heat conductive fins affixed to said tube, a fan for blowing air to be cooled through said fins, and means for selectively controlling the actuation of said fans.

16. The air conditioning system of claim 15 wherein said second heat exchangers further include means for collecting and removing water condensing on said fins.

* * * * *